May 31, 1927.

H. A. NORDWICK 1,630,273

DUPLEX CAM MOTOR

Filed June 17, 1926

INVENTOR
H. A. Nordwick
BY
ATTORNEY

May 31, 1927.

H. A. NORDWICK 1,630,273

DUPLEX CAM MOTOR

Filed June 17, 1926

INVENTOR
*H.A.Nordwick*

BY
ATTORNEY

May 31, 1927.

H. A. NORDWICK 1,630,273

DUPLEX CAM MOTOR

Filed June 17, 1926

INVENTOR
H. A. Nordwick

BY
ATTORNEY

Patented May 31, 1927.

1,630,273

UNITED STATES PATENT OFFICE.

HENRY A. NORDWICK, OF STOCKTON, CALIFORNIA, ASSIGNOR TO DUPLEX MOTOR COMPANY, OF SAN FRANCISCO, CALIFORNIA, A CORPORATION OF NEVADA.

DUPLEX-CAM MOTOR.

Application filed June 17, 1926. Serial No. 116,559.

This invention relates to improvements in internal combustion engines and particularly to that type using one or more large cams on a straight shaft, to take the place of the usual crank shaft.

Engines operating on this principle, but with different arrangement of parts, are shown in Patent No. 1,528,164, dated March 3rd, 1925, to H. A. Nordwick; in the application of Messrs. Nordwick, Wickersham and Marchetti, Serial No. 736,889, filed September 10th, 1924; in the application of Nordwick and Marchetti Serial No. 3,252, filed January 19th, 1925; and in the application of E. E. Wickersham, Serial No. 35,330, filed June 6th, 1925.

The present invention represents an improvement over all the above identified engines, as will be hereinafter evident.

In engines of this character some means must be provided for maintaining the connecting rod rollers in contact with the cam surface during the suction stroke of the pistons, when there is no tendency of the pistons to travel outwardly of the cylinders, and also to prevent said rollers from jumping from the cam at the top of the stroke, a tendency very evident at high speeds, when the momentum of the piston is great.

To insure proper operation of the engine and avoid a detrimental hammering action and vibration, the contact of the rollers with the cam must be positive at all points along the cam surface, as will be evident.

In the above mentioned previous devices, this problem was the main thing to be solved, and various means were employed for effecting the desired end.

In Patent No. 1,528,164, the solution took the form of opposed sets of rollers on the connecting rods, which engaged differently alined faces on the cam structure. Since the distances between the two faces along radial lines drawn through the cam structure at different points were not of course the same, the rollers, being fixed and having a definite spacing from each other, could not of course bear evenly against said faces at all times. They were either too far apart at times or too close at others, and the result was that a considerable play of the connecting rods relative to the cam was inevitably had.

The succeeding application showed a structure to accomplish the same result, using a series of fluid cylinders and a piston and lever arrangement to constantly bear down on the connecting rod rollers, and doing away with the double set of rollers previously used.

This also was not a success, on account of the "give" of the fluid, and the expense of construction.

The subsequent applications made use of gear-connected equalizing structures extending between connecting rods of adjacent cylinders, so that the upward movement of one rod would force the other down, and vice versa.

This arrangement, while theoretically good, failed to function properly in practice, due to the fact that the metal in the equalizing arms and other parts had a certain springiness, which it was impossible to overcome without making said parts so big and heavy as to be out of all proportion to the other parts of the engine.

The principal object of the present invention therefore is to eliminate all the above named defective features by providing an arrangement by means of which the various connecting rods will be positively maintained in unyielding relation to the cams at all points in the periphery of the latter, and by designing the cam with which the rollers engage in such a manner as to enable the proper engagement of the rollers with the cams to be had without any loose play or binding effect being had at any point.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
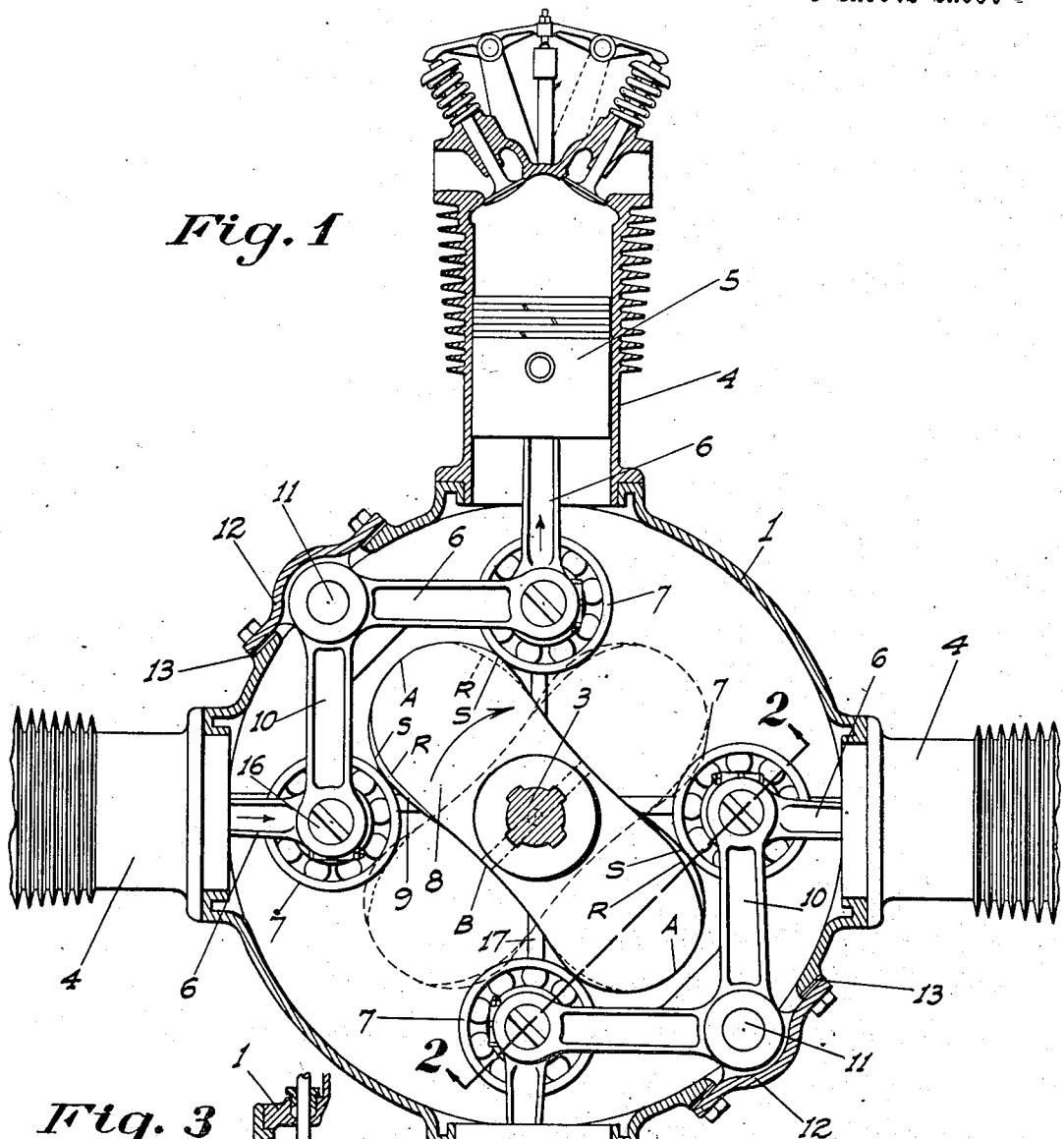
Fig. 1 is an end elevation mainly in section of my improved motor.
Figure 3:
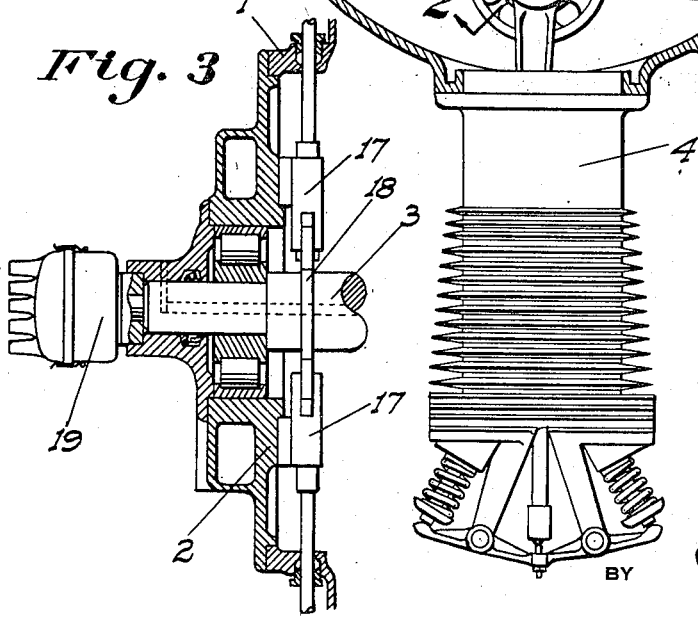
Fig. 3 is a fragmentary longitudinal section of the motor showing the mounting of the main shaft and the connection of the ignition distributor unit therewith.
Figure 2:
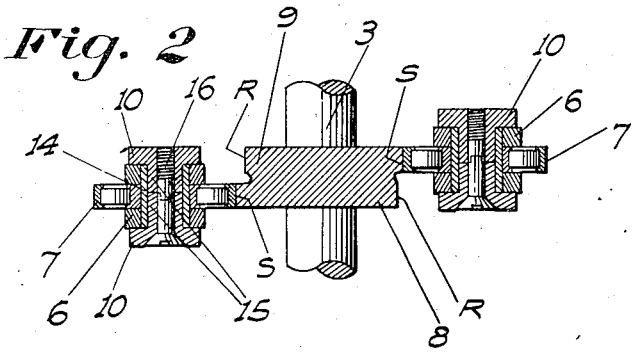
Fig. 2 is a fragmentary section on the line 2—2 of Fig. 1, showing the double cam and the connection of the rollers therewith.

Referring now more particularly to the characters of reference on the drawings, the engine shown in Figs. 1 to 3 comprises a cylindrical casing 1 having end plates 2 in which are journaled a shaft 3 concentric with the casing.

Mounted on and projecting outwardly from the casing rearwardly of the shaft are cylinders 4 having pistons 5. These cylinders are disposed 90 degrees apart. Connecting rods 6 are pivoted in the various pistons and carry rollers 7 on their outer ends which bear on cams 8 and 9 fixed in common in adjacent relationship to each other on the shaft 3. The rollers 7 of adjacent cylinders are offset longitudinally sufficient so as to enable one roller to ride on one cam and the other roller on the other cam.

The rollers of each adjacent pair of cylinders are permanently and rigidly connected together at their pivotal points by a right angle bellcrank or swing arm 10 which is mounted on a pivotal pin 11 supported by a plate 12. This pin is disposed centrally of the length of the arms and is mounted centrally between the cylinder axes. Shims 13 are placed between the plate and the casing so that said plate and the pin mounted thereon may be moved closer to or drawn away from the shaft, as may be necessary to get the proper and exact engagement of the rollers with the cams.

In connecting the rollers with the connecting rods and arms 10 I preferably provide a sleeve 14 for each roller, extending beyond the sides thereof, and either made as a separate piece or formed as one of the races of the roller, which is of the roller bearing type. The connecting rod 6 oscillates on this sleeve. The arm structure 10 is formed as a pair of separated members straddling the end of the rod 6, and has central and cooperating bosses 15 projecting inwardly toward each other and turnably mounted in the sleeve 14. The bosses and arms are then secured together by a screw bolt 16 or the like. This arrangement holds the parts securely together and avoids the need of using slit caps on the rods and arms.

The cams are of that type having two high points A and two low points B, disposed in diametrally opposed relation to each other, and giving one revolution of the shaft for each four strokes or one complete cycle of operations of the pistons, assuming that the motor is of the four cycle type.

The cam faces are generated throughout according to the swing or oscillation of the rollers through arcs governed by the pin 11 and the stroke of the pistons and rollers. The cams are symmetrical and identical but are reversed in position relative to each other to obtain proper contact of the rollers therewith at all times. This double cam and relative reversal of the positions thereof is necessary since one roller oscillates on an arc in a vertical plane toward the shaft, while the other at the same time oscillates in a horizontal plane away from the shaft. If the axes of the rollers 7 bore directly against the cam the distance from the pin 11 to the cam at any point would always be constant, regardless of the positioning of the cam relative to the rollers and pin. The added radius of the rollers however from the center thereof makes the distance from the pin 11 to the point of contact of the rollers with the cam different from the distance of said pin to the point of contact of the other roller with said cam when the rollers are at the top and bottom of their stroke. This difference is neutralized and reversed as the rollers reverse their position relative to the high and low point of the cam with the rotation of the latter. This difference in distance must therefore be compensated for in the cam design in order to insure the rollers riding properly thereon. This inherent difference in distance also prohibits both rollers riding on a single cam at all times, since otherwise the rollers being tied together would at one time either bind on the cam or at another time would have undue loose play thereon.

Arbitrarily choosing and knowing the stroke of the piston, or the distance from the low point B to the high point A the cam is therefore generated as follows:

The position of the pin is first arbitrarily determined, it being assumed that said pin is centralized on a line extending at 45 degrees from the shaft or midway between the axial lines of adjacent cylinders, at the point of intersection of two right angle lines drawn tangent to a circle C representing the center of stroke of the rollers, and so that the arcs D of oscillation of the rollers about the pin 11 will be the same distance on one side of the respective vertical and horizontal cylinder axial lines E and F at the top and bottom of the stroke as they are on the other side of such lines at the center of the stroke.

Radial lines G, preferably 15 degrees apart, are described from the central shaft 3, starting with the line E as zero. Circular lines H (one of which is the line C), are then described concentric with the shaft 3, and cutting through the lines G. The spacing of these circular lines corresponds to the stroke movement of the rollers had with the movement of the cam through various successive 15 degree arcs, from top to bottom of the stroke. These circular lines are located by first considering the movement of the rollers to be uniformly accelerated and decelerated from top to bottom of the stroke, as is desired; the spacing of the circular lines being calculated as being in the proportion of 1, 3, 5, 5, 3, 1, relative to the 15 degree radiating lines. That is, during the fifteen degrees of rotation of the cam the roller and piston travels one unit, with the next 15 degrees of rotation, the roller travels three units, and so on.

Using the distance from the pin 11 to the center of the roller as a radius, arcs J are first described across the circular lines H successively from the outermost line inwardly, with the center as the intersection of the lines G with the circular line K, downwardly in successive order from the actual position of the pin 11, the arcs J being located between the lines E and F. This line K is a line concentric with the shaft 3 passing through the axis of the pin 11.

Six of such arcs, counting from the pin 11 as a starting point, will represent a 90 degree movement of the cam or one stroke. Arcs L equal in radius to the radius of the roller are then described, toward the shaft, using the intersection of the lines H and the arcs J as the centers. The cam outline R for said stroke is then projected tangentially to the arcs 11 and represents the face of the cam engaged by the upper roller 7 on its down stroke and by the horizontal roller on its outward stroke. Arcs J', corresponding to the arcs J are then described across the circular lines H successively between the lines E and F from the innermost line outwardly. The centers of these arcs are at the intersection of the lines G and K extending successively from the pin 11 as a starting point upwardly. Roller-arcs are then described toward the shaft 3 with the intersection of the arcs J' with the lines H as centers. The cam outline S is then projected tangentially to said arcs and represents the face of the cam engaged by the horizontal roller 7 on its downward stroke and engaged by the upper roller on its outward stroke.

As a result it will be found that the portion R is flatter than the portion S, the difference in distance between these two portions corresponding to the difference in distance between the pin 11 and the points of contact of the rollers with the cam at different times.

Having one 90 degree portion or one stroke of both cam faces generated it is of course a mere matter of duplication to complete the lay-out of the cam. To attain the desired result the cams are made duplicates of each other with the faces of relatively flat outline disposed in alternately opposed order, and the cams are then placed together (or built as one) with such relatively flat portions arranged in the reverse order, as shown in Fig. 1. This is necessary, since as previously pointed out, the adjacent rollers are tied together and must swing in opposite directions relative to the shaft as they move in and out on their strokes.

There being four strokes of each piston for each revolution of the shaft the valve operating push rods 17 may of course operate on a cam 18 mounted directly on the shaft 3, and in such a manner as to provide for a consecutive firing order of the cylinders. Also the ignition distributor unit 19 may be mounted at one end of the shaft, so that the moving member of said unit may be driven directly from the shaft. This avoids the necessity of gears or a separate cam shaft for either the valves or ignition mechanism.

The 90 degree radial type of engine above described is particularly suitable for airplane use, four cylinders in two independent pairs being grouped in a common plane about the shaft 3.

Figure 4:
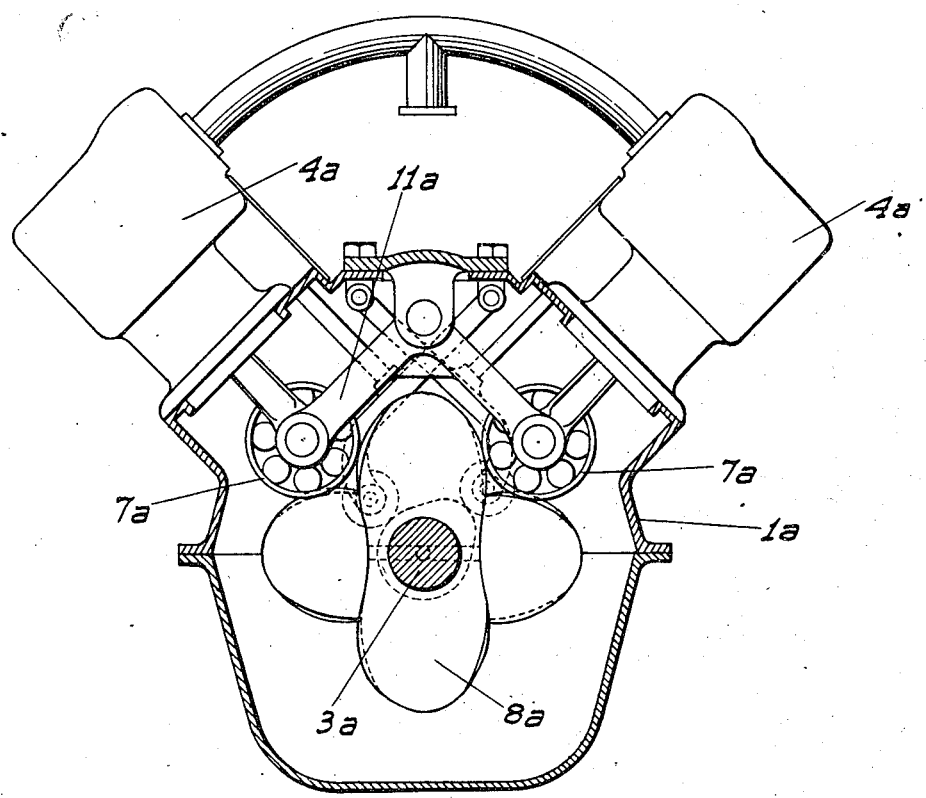
Fig. 4 is a sectional end elevation of a motor showing a modified arrangement of the cylinders.
Figure 5:
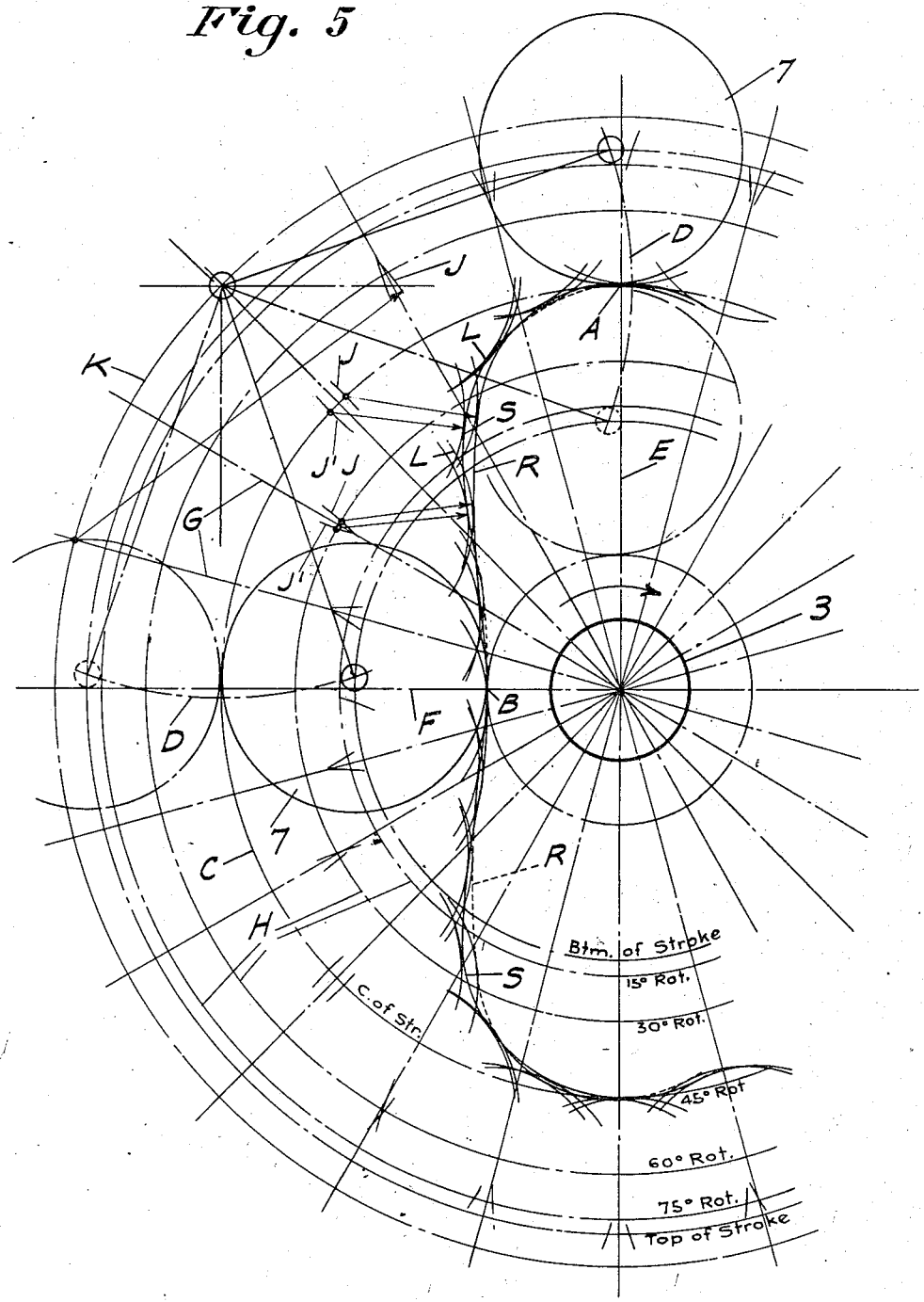
Fig. 5 is a diagrammatically lay-out showing the generation of the cam.

In Fig. 4 I have shown a V type engine built on the same principle but more suitable for motor vehicles.

In this engine the cylinders $4^a$ are arranged in longitudinally spaced and alined pairs on the casing $1^a$, the cylinders of each pair being set 90 degrees apart and symmetrically disposed relative to a vertical plane. The connecting rod rollers $7^a$ of each pair are tied together as in the other type by a rigid arm structure $11^a$ and bear as before on a double or duplex cam member $8^a$ mounted on the shaft $3^a$.

The rollers of each additional pair of cylinders bear on individual cams, which are preferably set at an angle to the other cams, while all said cams are of course rigidly fixed on the one central shaft.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In an internal combustion engine, a shaft, a pair of cylinders disposed radially of the shaft at an angle to each other, pistons in the cylinders, connecting rods pivoted in the pistons, rollers on the outer ends of the rods, a cam structure on the shaft on which the rollers ride and designed to allow the rollers to have four strokes for each revolution of the shaft, and a rigid arm member pivoted in a fixed position centrally of its length between the cylinders and pivoted onto the rods in common with the rollers.

2. In an internal combustion engine, a shaft, a pair of cylinders disposed radially of the shaft at a 90 degree angle to each other, pistons in the cylinders, connecting rods pivoted in the pistons, rollers on the outer ends of the rods, a rigid arm structure pivoted in a fixed position at the intersection of lines projected at right angles to the axial lines of the cylinders centrally of the stroke of the rollers and connected at its ends to the rods in common with the rollers, and a cam structure on which the rollers bear designed to allow the rollers four strokes for each revolution of the shaft.

3. In an internal combustion engine, a shaft, a pair of cylinders disposed radially of the shaft at a 90 degree angle to each other, pistons in the cylinders, connecting rods pivoted in the pistons, rollers on the outer ends of the rods, a rigid arm structure pivoted in a fixed position at the intersection of lines projected at right angles to the axial lines of the cylinders centrally of the stroke of the rollers and connected at its ends to the rods in common with the rollers, whereby the rollers will oscillate simultaneously in right angled planes and in the reverse direction to each other, and independent cams for the rollers each to allow of four strokes of the rollers for each revolution of the shaft, the cams being each generated to compensate for the relative difference in movement of the other roller interconnected therewith to cause said rollers to bear constantly against the cams at all points of their strokes.

4. In an internal combustion engine, a shaft, a pair of cylinders disposed radially of the shaft at an angle to each other, pistons in the cylinders, connecting rods pivoted in the pistons, rollers on the outer ends of the rods, means rigidly connecting said rollers together to cause them to oscillate radially of the shaft during their strokes in reverse directions, and a cam for each roller to allow of four strokes of the same with each revolution of the shaft, said cam being generated with respect to the movement of the other roller on its cam as to cause said rollers to bear equally on their cams at any positions of the cams and rollers.

5. In an internal combustion engine, a shaft, a pair of cylinders disposed radially of the shaft at a 90 degree angle to each other, pistons in the cylinders, connecting rods pivoted in the pistons, rollers on the outer ends of the rods, an arm structure pivoted in a fixed position at the intersection of lines projected at right angles to the axial lines of the cylinders centrally of the stroke of the rollers and connected at its ends to the rods in common with the rollers, whereby the rollers will oscillate simultaneously in right angled planes and in the reverse direction to each other, and independent cams for the rollers to allow of four strokes of the same with each revolution of the shaft; a method of generating said cams to compensate for the relative difference in movement of the rollers, consisting in describing a line concentric with the shaft and passing through the fixed pivot of the arm structure, laying off radial lines from the shaft to intersect said circular line, describing circular lines concentric with the shaft between the top and bottom positions of the axes of the rollers, the radial spacing of said circular lines being proportionate to the angular spacing of the radial lines, intersecting said circular lines in order with arcs centered at the intersection of said radial lines with the first named circular line; in successive order and in both directions from said pivot, the arcs cutting said circular lines on the opposite sides respectively of the pivot of the arm structure and in reverse order between the right angled axial lines of the cylinders; the radius of said arcs being the distance between said pivot and the axes of the rollers, describing arcs toward one of said axial lines from the intersections of the first named arcs with the circular lines in successive order, the radius of said last named arcs being the radius of the rollers, drawing lines tangentially through said last named arcs in respective order, whereby the one-stroke surfaces of the two cams are formed, and then laying out the remainder of the cams by placing said generated portions in alternating and reverse order to each other about the shaft as an axis.

In testimony whereof I affix my signature.

HENRY A. NORDWICK.